Oct. 24, 1933.  E. MILLER  1,932,141

GENEVA MOVEMENT DEVICE

Filed April 16, 1932   2 Sheets-Sheet 1

Inventor
EDWARD MILLER

By *[signature]*

Attorneys

Oct. 24, 1933.  E. MILLER  1,932,141
GENEVA MOVEMENT DEVICE
Filed April 16, 1932  2 Sheets-Sheet 2
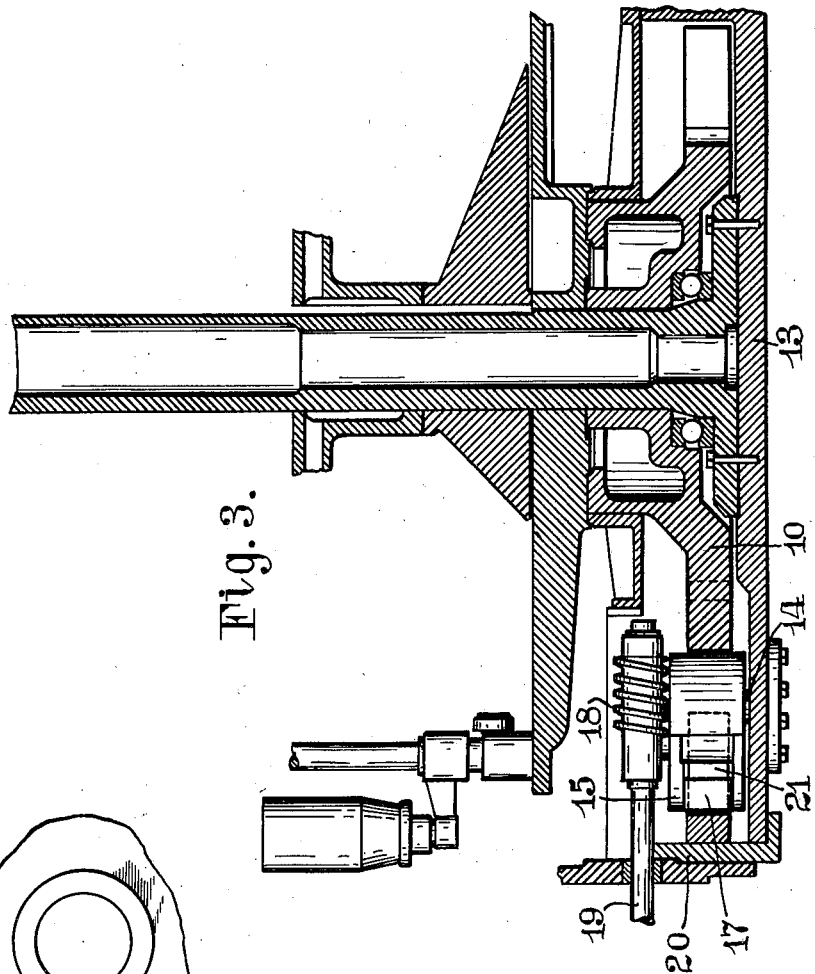
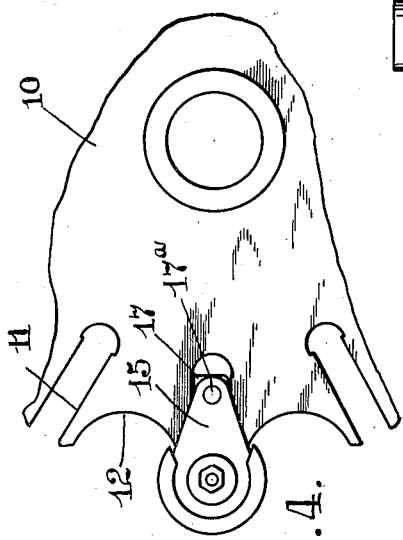
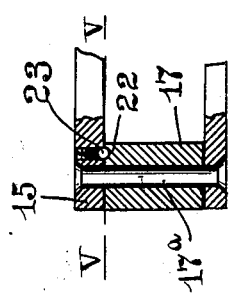
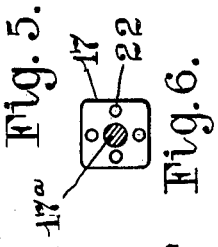
Inventor
EDWARD MILLER
By
Attorneys Patented Oct. 24, 1933

1,932,141

UNITED STATES PATENT OFFICE

1,932,141

GENEVA MOVEMENT DEVICE

Edward Miller, Columbus, Ohio, assignor to Lynch Corporation, Anderson, Ind., a corporation of Indiana Application April 16, 1932. Serial No. 605,680

6 Claims. (Cl. 74—41)

This invention relates to a means or "movement" of the Geneva type, so called, for converting a continuous rotary motion into an intermittent one, the present instance being intended more particularly for use in operating the table of a glass blowing or molding machine.

Heretofore in such Geneva movements there was employed a table, the driven member having a radially slotted or notched circumference, said table being actuated by a continuously rotated drive member carrying an eccentrically mounted roller that successively engages the slots to impart the intermittent motion to the table. In such former construction the roller provides a line operating contact resulting in rapid wear of the roller and slots due to the heavy work involved. This resulted in lost motion in operation and the necessity of frequent replacement of the roller and driven member.

The object of the present invention is to provide an improved construction whereby the troubles mentioned are to a large extent reduced.

The invention is embodied in the example herein shown and described, the features of novelty being finally claimed.

In the accompanying drawings—

Fig. 3 is a section on the same line II—II Fig. 1, with some parts in full.

Fig. 4 is a plan view of a detail showing the block engaged with the slots in the table or driven member.

Fig. 5 is a detail in vertical section of a modification of the block.

Fig. 6 is a section on the line V—V Fig. 5 looking down.

Figure 1:
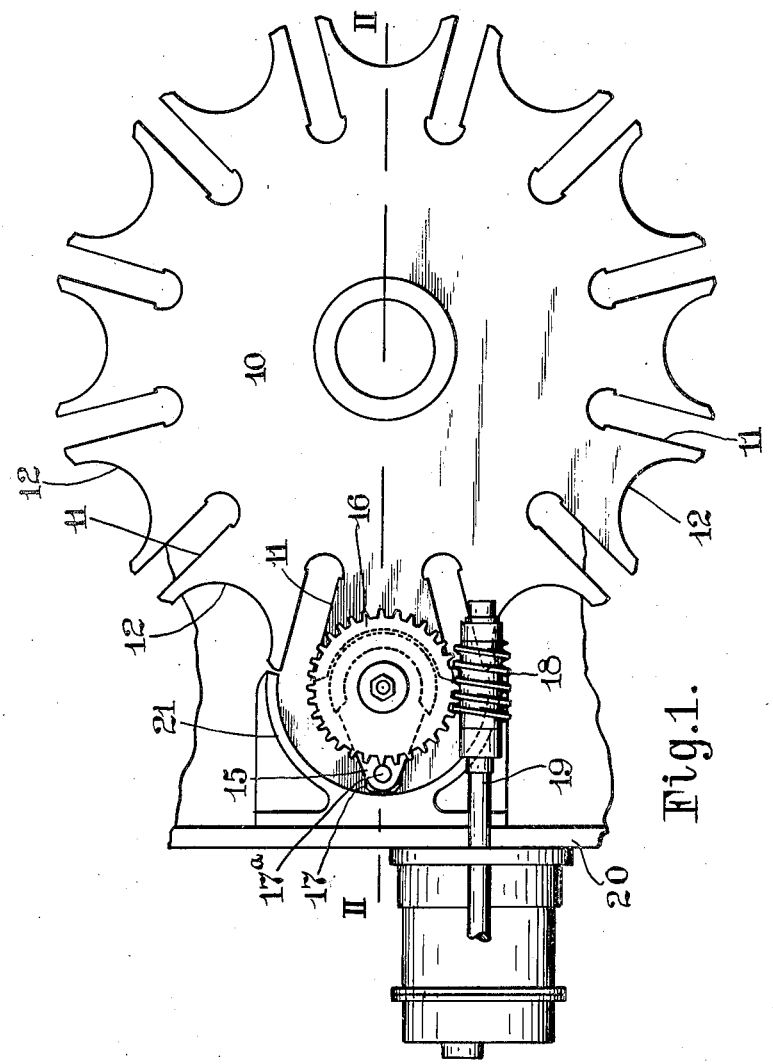
Figure 1 is a top plan view of a machine according to the invention.
Figure 2:
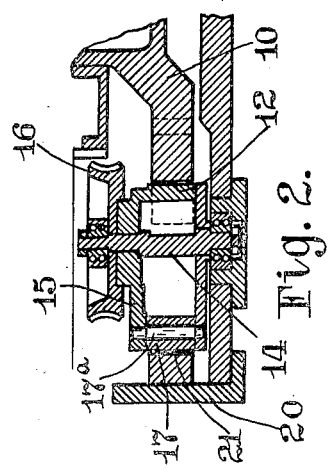
Fig. 2 is a vertical section on the line II—II Fig. 1.

In the views 10 designates a circular table or driven member which is provided in its circumference with a series of regularly spaced radial slots or notches 11 alternating with arcuate recesses 12. The said table or wheel is journaled with suitable bearings on a bed 13.

The driving member includes a spindle 14 having secured to rotate with it a frame 15 and a worm wheel 16. Journaled in the frame parallel and eccentrically with respect to the axis of the spindle 14 is a block 17. Said block is square in horizontal cross section with rounded corners and primarily of a diameter to fit in the radial slots of the driven member. Said block 17 is journaled on a pin 17ª. The upper end of the spindle 14 and frame 15 has secured to it a worm wheel 16 engaged by a worm 18 provided with a shaft 19 to which suitable power is applied to rotate the frame and move the block 17 into and out of engagement with the slots of the driven wheel to intermittently drive that wheel.

Mounted on a vertical flange 20 attached to the bed is an arcuate guide rail 21 within which the block 17 travels and is held from rotation or in position to enter the successive slots.

The end of the frame opposite that carrying the block 17 is formed with an arcuate flange to fit in each of the arcuate recesses 12 to prevent movement of the table in the interval when the block 17 is not actuating the table.

Because the block has flat surfaces to contact with the walls of the slots the wear of such construction is not rapid. Moreover, in operation the block makes a half turn on its axis by reason of its traverse in the slot and guide so that opposite sides of the block are the pressing sides.

The guide can be omitted and an adjustment of the block on its axis effected to present either pair of the four sides for operating contact with the walls of the slots in the driven wheel by providing the block at one of its ends with sockets 22 to be engaged as desired by a spring pressed ball 23 in the frame, as shown in Figs. 5 and 6.

The forms of the parts can be changed without departing from the gist of the invention as claimed.

What I claim is:

1. In a Geneva movement device including a driven wheel provided with slots in its circumference, a driving member carrying an eccentrically mounted block to engage a wall of each of said slots, said block being substantially square in cross section.

2. In a Geneva movement device including a driven wheel provided with slots in its circumference, a driving member carrying an eccentrically mounted block to engage a wall of each of said slots, said block being substantially square in cross section with rounded corners.

3. In a Geneva movement device including a driven wheel provided with slots in its circumference, and recesses between said slots, a driving member carrying an eccentrically mounted block to engage a wall of each of said slots, said block being substantially square in cross section.

4. In a Geneva movement device including a driven wheel provided with slots in its circumference and with recesses between said slots, a driving member carrying an eccentrically and rotatably mounted block having flat faces in parallel planes each adapted to engage a wall of each of said slots and means carried with said driving member to enter said recesses to prevent movement of the driven member in the interval between the operations of said block.

5. In a Geneva movement device including a driven wheel provided with slots in its circumference, a driving member carrying rotatably an eccentrically mounted prismatic block rectangular in cross section to engage a wall of each of said slots and a guide for said block while traveling beyond the slots.

6. In a Geneva movement device including a driven wheel provided with slots in its circumference, a driving member carrying an eccentrically mounted block to engage a wall of each of said slots, said block being substantially square in cross section and a guide for said block while traveling beyond the slots.

EDWARD MILLER.